United States Patent
Huang

(10) Patent No.: US 8,752,965 B2
(45) Date of Patent: Jun. 17, 2014

(54) STEREOSCOPIC DISPLAY APPARATUS

(75) Inventor: June-Jei Huang, Taoyuan Hsien (TW)

(73) Assignee: Delta Electronics, Inc., Taoyuan Hsien (TW)

(*) Notice: Subject to any disclaimer, the term of this patent is extended or adjusted under 35 U.S.C. 154(b) by 177 days.

(21) Appl. No.: 13/526,547

(22) Filed: Jun. 19, 2012

(65) Prior Publication Data
US 2013/0155378 A1    Jun. 20, 2013

(30) Foreign Application Priority Data

Dec. 16, 2011   (TW) .............................. 100146698 A

(51) Int. Cl.
G03B 21/00    (2006.01)
G03B 21/14    (2006.01)
H04N 13/04    (2006.01)
H04N 9/47     (2006.01)
G02B 27/26    (2006.01)

(52) U.S. Cl.
USPC ................. 353/8; 353/82; 348/57; 359/465

(58) Field of Classification Search
CPC .... G02B 27/26; G02B 27/2264; G02B 27/22; G02B 27/283; G03B 35/26; H04N 13/0434; H04N 13/0438; H04N 13/0402
USPC .................. 353/7, 8, 81, 82; 348/54, 57, 58; 359/465, 489.08, 489.09
See application file for complete search history.

(56) References Cited

U.S. PATENT DOCUMENTS

| 6,961,045 B2* | 11/2005 | Tsao ............................ 345/103 |
| 7,686,455 B2* | 3/2010 | Yoshimura et al. ............ 353/31 |
| 2009/0086016 A1 | 4/2009 | Su | |
| 2009/0128780 A1* | 5/2009 | Schuck et al. .................. 353/20 |
| 2011/0013143 A1* | 1/2011 | Yoon ............................. 352/60 |
| 2012/0170000 A1* | 7/2012 | Imaoka et al. ................. 353/20 |

FOREIGN PATENT DOCUMENTS

TW    200912381 A    3/2009

* cited by examiner

*Primary Examiner* — William C Dowling
*Assistant Examiner* — Ryan Howard
(74) *Attorney, Agent, or Firm* — CKC & Partners Co., Ltd.

(57) ABSTRACT

A stereoscopic display apparatus includes an image projection module, a plurality of projection lenses and an optical path switching module. The optical path switching module is disposed between the image projection module and the projection lenses. The optical path switching module has a light-incident surface and different light-emitting surfaces. An image signal generated by the image projection module enters the optical path switching module through the light-incident surface. The optical path switching module includes a plurality of polarization beam splitters and a polarization adjusting module. The polarization adjusting module is disposed between the polarization beam splitters. The optical path switching module is used for switching the polarization adjusting module time-sequentially for guiding the image signal to those different light-emitting surfaces respectively, and accordingly a plurality of image formation beams are formed from the light-emitting surfaces though the projection lenses.

10 Claims, 8 Drawing Sheets

STEREOSCOPIC DISPLAY APPARATUS

RELATED APPLICATIONS

This application claims priority to Taiwan Patent Application Serial Number 100146698, filed Dec. 16, 2011, which is herein incorporated by reference.

BACKGROUND

1. Technical Field

The present disclosure relates to a display. More particularly, the present disclosure relates to a stereoscopic display apparatus and optical structures thereof.

2. Description of Related Art

In recent years, many breakthroughs have been achieved in the stereoscopic display technology. Stereoscopic televisions and movies are widespread in practical applications. The stereoscopic visual effects are brought to viewers by projecting left-vision and right-vision images representing different visual angles to eyes of viewers separately. In order to simulate the natural two-eye vision, the left-vision and right-vision images can be utilized to generate the depth of field effect due to the distance between two eyes.

The left-vision and right-vision images have to be projected to two eyes of viewer independently, and for example, the right eye of viewer can not see the left-vision image, and vice versa. The stereoscopic display technology usually utilizes an optical filter glass worn by the viewer, to achieve the separation of right/left vision images. Two-color filtering and polarization-direction filtering are the common methods to achieve the separation. Both of the methods demand viewers to wear specific glasses to separate image information for two eyes on the same screen.

A naked-eye stereoscopic displaying technology, which is one kind of cutting-edge stereoscopic displaying methods, allows viewers to observe a stereoscopic image effect without wearing specific stereoscopic glasses. Reference is made to FIG. 1, which is a schematic diagram illustrating a conventional stereoscopic display apparatus 100

As shown in FIG. 1, the conventional stereoscopic display apparatus 100 generally includes two projectors 120 and 122, a double convex lens array (including a convex lens layer 142 and another convex lens layer 144) and a scattering layer 146 disposed between two convex lens layers. So far, the conventional stereoscopic display apparatus generally utilizes two individual projectors 120 and 122 to form two image displaying areas 160 and 162 on an observation plane, so as to present left-eye/right-eye visions and perform the stereoscopic visual effect. In the conventional way, two projectors 120 and 122 are used for forming two image displaying areas 160 and 162. When there are more image displaying areas to be projected, more projectors are needed in the conventional design. Therefore, the conventional stereoscopic display apparatus is often expensive, heavy, huge and inconvenient in portable applications.

SUMMARY

In order to solve aforesaid problems, the disclosure provides a stereoscopic display apparatus including an optical path switching module. The optical path switching module has a light-incident surface and several different light-emitting surfaces. By utilizing a switchable polarization adjusting module of the optical path switching module, an image signal generated by one single image projection module is guided to different projection lenses via each of the light-emitting surfaces time-sequentially. Therefore, the image projection module combined with the optical path switching module in the invention may equivalently form several optical outlet paths, such that no extra image projection module is needed for corresponding to multiple image displaying areas. Without implementing extra image projection module, the total cost, weight and size of the stereoscopic display apparatus can be reduced.

An aspect of the invention is to provide a stereoscopic display apparatus including an image projection module, a plurality of projection lenses and an optical path switching module. The optical path switching module is disposed between the image projection module and the projection lenses. The optical path switching module has a light-incident surface and different light-emitting surfaces. An image signal generated by the image projection module enters the optical path switching module through the light-incident surface. The optical path switching module includes a plurality of polarization beam splitters and a polarization adjusting module. The polarization adjusting module is disposed between the polarization beam splitters. The optical path switching module is used for switching the polarization adjusting module time-sequentially for guiding the image signal to different light-emitting surfaces respectively, so as to form a plurality of image formation beams from the light-emitting surfaces through the projection lenses. One of the image formation beams is corresponding to a left-vision image, and another one of the image formation beams is corresponding to a right-vision image.

According to an embodiment of the invention, the projection lenses include a first projection lens and a second projection lens. The optical path switching module includes a first polarization beam splitter and a second polarization beam splitter. The first polarization beam splitter has a light-incident surface. The image signal enters the optical path switching module through the light-incident surface of the first polarization beam splitter. The first polarization beam splitter is used for spitting the image signal into a first polarization beam and a second polarization beam with different polarization directions. The second polarization beam splitter has a first light-emitting surface and a second light-emitting surface different from the first light-emitting surface. The second polarization beam splitter is used for combining the first polarization beam and the second polarization beam. The polarization adjusting module is disposed on an optical path between the first polarization beam splitter and the second polarization beam splitter. The optical path switching module is used for switching the polarization adjusting module time-sequentially.

At a first time spot, the polarization adjusting module is switched on. The polarization directions of the first polarization beam and the second polarization beam are alternated. A beam combined by the second polarization beam splitter is projected from the first light-emitting surface to the first projection lens for forming a first image formation beam.

At a second time spot, the polarization adjusting module is switched off. The polarization directions of the first polarization beam and the second polarization beam are unchanged. A beam combined by the second polarization beam splitter is projected from the second light-emitting surface to the second projection lens for forming a second image formation beam.

According to an embodiment of the invention, each of the first polarization beam and the second polarization beam has a different polarization direction in which is an S-polarized or P-polarized beam.

According to an embodiment of the invention, the S-polarized beam is reflected and redirected while passing through the first polarization beam splitter and the second polarization beam splitter, and the P-polarized beam passes straight through the first polarization beam splitter and the second polarization beam splitter.

According to an embodiment of the invention, the optical path switching module further includes a first reflective prism and a second reflective prism. Two sides of the first reflective prism are adjacent to one side of the first polarization beam splitter and one side of the second polarization beam splitter. Two sides of the second reflective prism are adjacent to another side of the first polarization beam splitter and another side of the second polarization beam splitter.

According to an embodiment of the invention, the polarization adjusting module includes a switchable liquid crystal layer, a switchable ferroelectric liquid crystal layer, a switchable Faraday rotator, a switchable Pockets cell optical modulator or a switchable Kerr cell optical modulator.

According to an embodiment of the invention, the projection lenses include a first projection lens, a second projection lens and a third projection lens. The optical path switching module includes a first polarization beam splitter, a second polarization beam splitter, a third polarization beam splitter and a fourth polarization beam splitter. The first polarization beam splitter has a light-incident surface. The image signal enters the optical path switching module through the light-incident surface of the first polarization beam splitter. The third polarization beam splitter has a third light-emitting surface. The fourth polarization beam splitter has a first light-emitting surface and a second light-emitting surface different from the first light-emitting surface. The polarization adjusting module includes a first polarization adjusting unit, a second polarization adjusting unit, a third polarization adjusting unit, a fourth polarization adjusting unit and a fifth polarization adjusting unit. The first polarization adjusting unit is disposed on an optical path between the first polarization beam splitter and the third polarization beam splitter. The second polarization adjusting unit is disposed on an optical path between the first polarization beam splitter and the second polarization beam splitter. The third polarization adjusting unit is disposed on an optical path between the third polarization beam splitter and the fourth polarization beam splitter. The fourth polarization adjusting unit is disposed on an optical path between the second polarization beam splitter and the fourth polarization beam splitter. The fifth polarization adjusting unit is disposed on an optical path between the second polarization beam splitter and the third polarization beam splitter.

At a first time spot, the first polarization adjusting unit is switched on; the second polarization adjusting unit is switched off; the third polarization adjusting unit is switched off; and the fourth polarization adjusting unit is switched on. The image signal is projected from the first light-emitting surface to the first projection lens for forming a first image formation beam.

At a second time spot, the first polarization adjusting unit is switched on; the second polarization adjusting unit is switched off; the third polarization adjusting unit is switched on; and the fourth polarization adjusting unit is switched off. The image signal is projected from the second light-emitting surface to the second projection lens for forming a second image formation beam.

At a third time spot, the first polarization adjusting unit is switched off; and the second polarization adjusting unit is switched on. The image signal is projected from the third light-emitting surface to the third projection lens for forming a third image formation beam.

According to an embodiment of the invention, each of the first polarization adjusting unit, the second polarization adjusting unit, the third polarization adjusting unit and the fourth polarization adjusting unit of the polarization adjusting module includes a switchable liquid crystal layer, a switchable ferroelectric liquid crystal layer, a switchable Faraday rotator, a switchable Pockels cell optical modulator or a switchable Kerr cell optical modulator.

According to an embodiment of the invention, the fifth polarization adjusting unit of the polarization adjusting module includes a half wave phase retarder.

According to an embodiment of the invention, the optical path switching module further includes a first reflective prism and a second reflective prism. Two sides of the first reflective prism are adjacent to one side of the first polarization beam splitter and one side of the third polarization beam splitter. Two sides of the second reflective prism are adjacent to one side of the second polarization beam splitter and one side of the fourth polarization beam splitter.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiments, with reference to the accompanying drawings as follows.

DESCRIPTION OF THE EMBODIMENTS

In the following description, several specific details are presented to provide a thorough understanding of the embodiments of the present invention. One skilled in the relevant art will recognize, however, that the present invention can be practiced without one or more of the specific details, or in combination with or with other components, etc. In other instances, well-known implementations or operations are not shown or described in detail to avoid obscuring aspects of various embodiments of the present invention.

Figure 1:
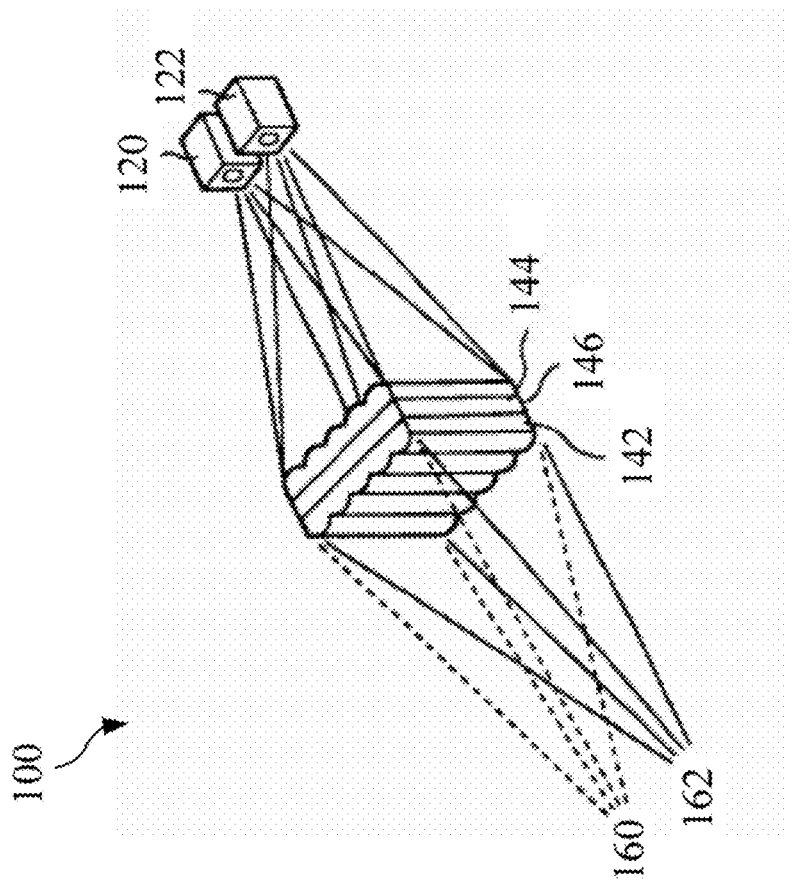
FIG. 1 is a schematic diagram illustrating a conventional stereoscopic display apparatus.
Figure 2:
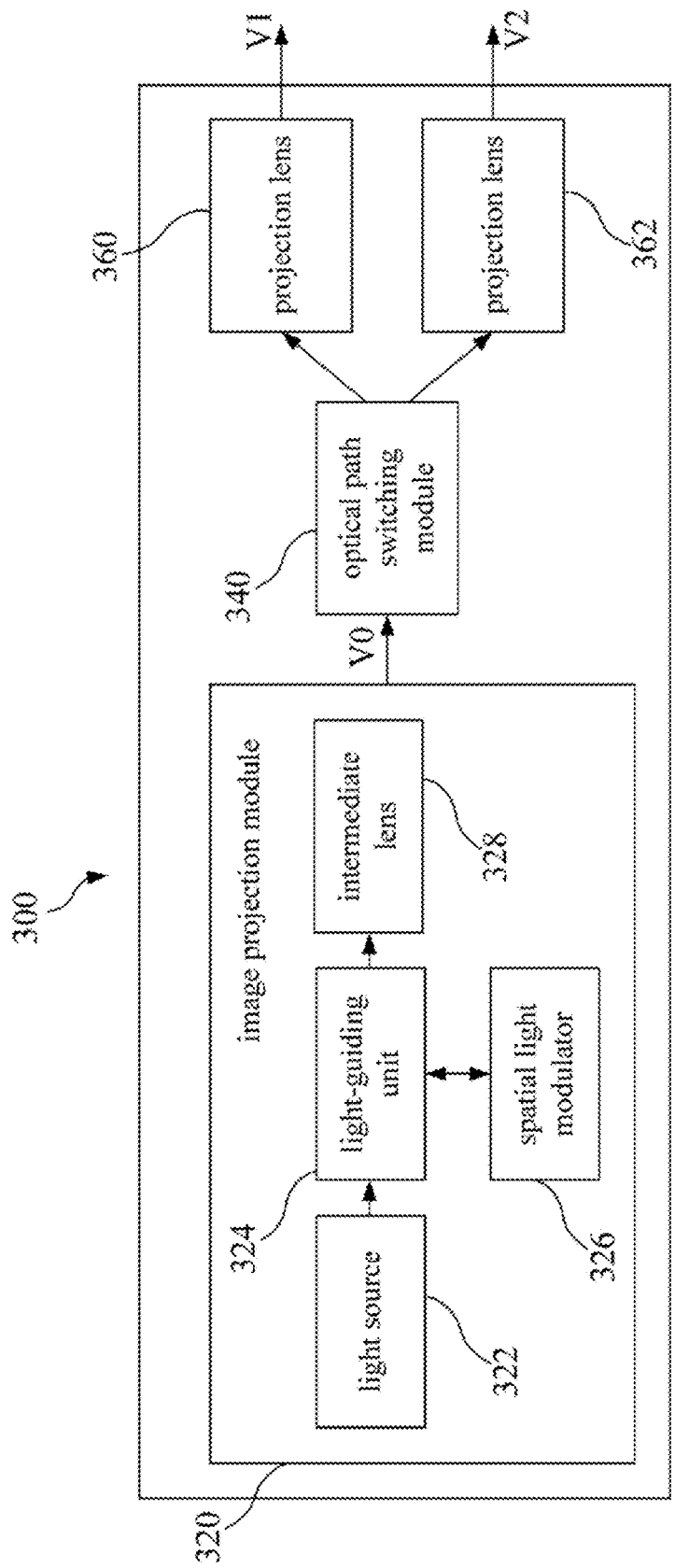
FIG. 2 is a functional block diagram illustrating a stereoscopic display apparatus according to an embodiment of the invention.

Reference is made to FIG. 2, which is a functional block diagram illustrating a stereoscopic display apparatus 300 according to an embodiment of the invention. As shown in FIG. 2, the stereoscopic display apparatus 300 includes an image projection module 320, an optical path switching module 340 and a plurality of projection lenses. In this embodiment, the stereoscopic display apparatus 300 includes two sets of projection lenses 360 and 362, but the invention is not limited thereto.

The image projection module 320 is used for generating an image signal V0, as shown in FIG. 2. In practical applications, the image projection module 320 may include a light source 322, a light-guiding unit 324, a spatial light modulator (SLM) 326 and a relay lens unit 328.

Figure 3:
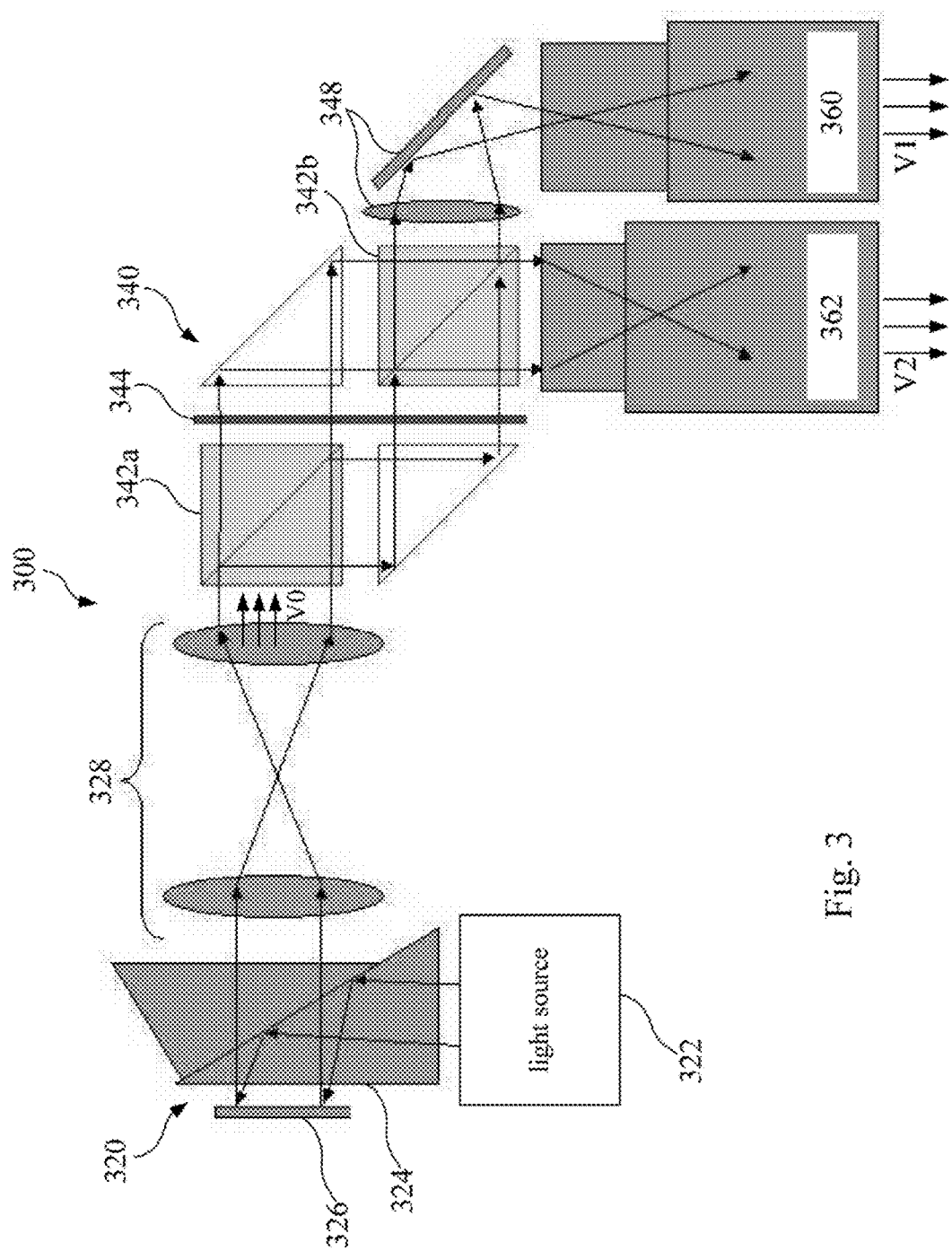
FIG. 3 is a schematic diagram illustrating optical structures of the stereoscopic display apparatus shown in FIG. 2 according to an embodiment of the invention.

Reference is made to FIG. 3 at the same time. FIG. 3 is a schematic diagram illustrating optical structures of the stereoscopic display apparatus 300 shown in FIG. 2 according to an embodiment of the invention. As shown in FIG. 2 and FIG. 3, the beam generated by the light source 322 is guided by the light-guiding unit 324 and forms an optical signal with contents of displaying information (information of colors, brightness, and patterns corresponding to right-eye and left-eye visions) through the spatial light modulator 326. The optical signal is outputted via an intermediate lens 328 as an intermediate image (i.e., the image signal V0 in the embodiment) corresponding to the displaying information.

The optical path switching module 340 is disposed between the image projection module 320 and the projection lenses 360 and 362. The optical path switching module 340 has a light-incident surface facing the image projection module 320 and multiple light-emitting surfaces (two light-emitting surfaces in this embodiment) facing the projection lenses 360 and 362 respectively. The optical path switching module 340 guides the image signal V0 to different light-emitting surfaces (the light-emitting surface 360 or 362) according to a time-sequence, so as to form different formation beams (the formation beam V1 or V2).

The optical path switching module 340 includes a polarization beam splitter (PBS) 342a, another polarization beam splitter 342b and a polarization adjusting module 344. The polarization adjusting module 344 is disposed between the polarization beam splitter 342a and the polarization beam splitter 342b.

The optical path switching module 340 switches the polarization adjusting module 344 time-sequentially for guiding the image signal V0 to different light-emitting surfaces respectively, so as to form two image formation beams V1 and V2 from the light-emitting surfaces through the projection lenses 360 and 362. One of the image formation beams is corresponding to an observer's left eye, and is a left-vision image. Another one of the image formation beams is corresponding to an observer's right eye, and is a right-vision image.

In this case, the image signal generated by one single image projection module 320 can be guided to multiple projection lenses by the optical path switching module 340, thereby forming image observation areas with different visual angles on an observation plane, so as to achieve the stereoscopic visual effect.

Figure 4:
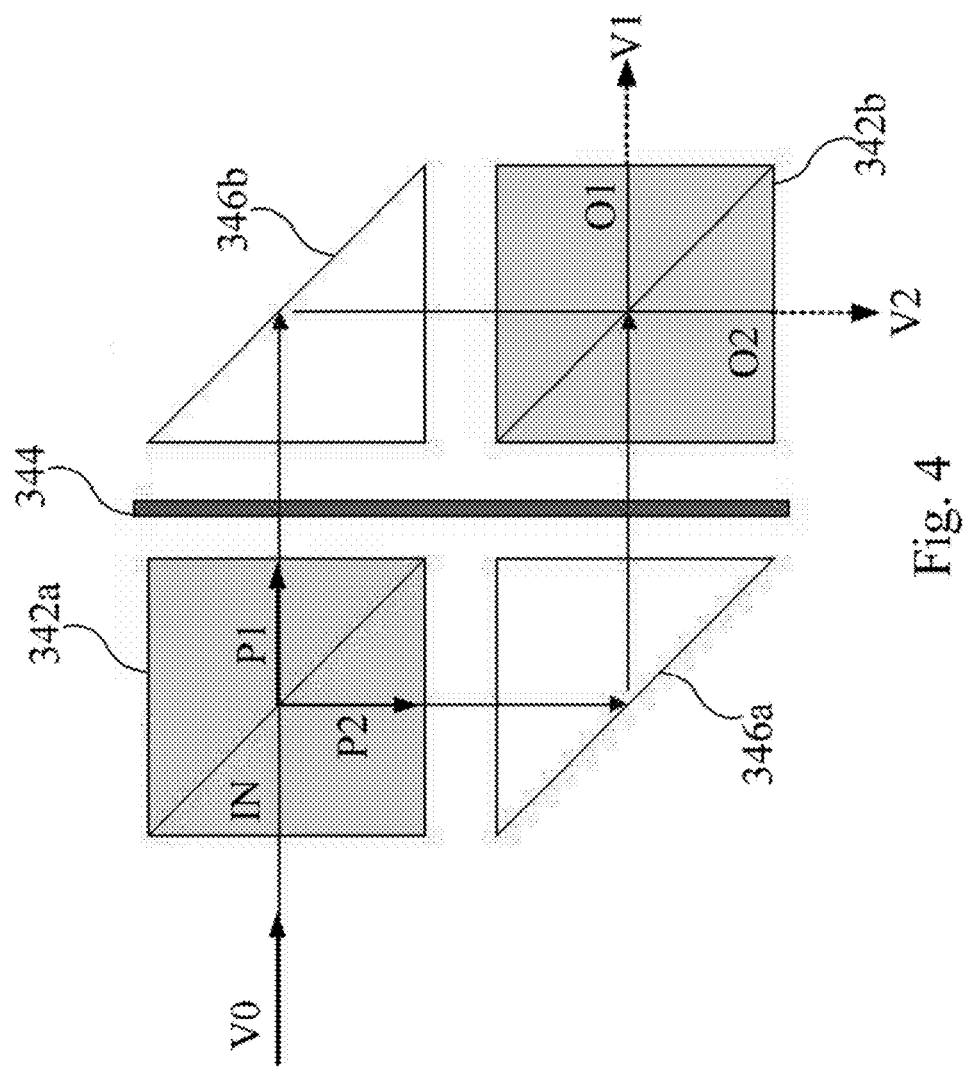
FIG. 4 is a schematic diagram illustrating an optical path switching module shown in FIG. 3.

Following paragraphs are detail explanations about how to guide the image signal V0 time-sequentially to different light-emitting surfaces by the optical path switching module 340. Reference is made to FIG. 4 at the same time. FIG. 4 is a schematic diagram illustrating the optical path switching module 340 shown in FIG. 3.

As shown in FIG. 4, the optical path switching module 340 includes the polarization beam splitter 342a and the polarization beam splitter 342b. The polarization beam splitter 342a includes a light-incident surface IN. The image signal V0 enters the polarization beam splitter 342a from the light-incident surface IN. The polarization beam splitter 342a is used for spitting the image signal V0 into a polarization beam P1 and a polarization beam P2 with different polarization directions. In this embodiment, a polarization direction of the polarization beam P1 is P-polarized, and a polarization direction the polarization beam P2 is S-polarized.

The polarization beam splitter 342b has a first light-emitting surface O2 and a second light-emitting surface O2 different from the first light-emitting surface O1. The second polarization beam splitter 342b is used for combining the polarization beam P1 and the polarization beam P2.

Each of the polarization beam splitters has an optical selective surface. The S-polarized beam is reflected and redirected while passing through the polarization beam splitter 342a and the polarization beam splitter 342b. The P-polarized beam passes straight through the polarization beam splitter 342a and the polarization beam splitter 342b.

The polarization adjusting module 344 is disposed on an optical path between the polarization beam splitter 342a and the polarization beam splitter 342b. The optical path switching module 340 is used or switching the polarization adjusting module 344 time-sequentially. In the embodiment, a switchable half wave plate is adopted as the polarization adjusting module 344. In other applications, a switchable liquid crystal layer, a switchable ferroelectric liquid crystal layer, a switchable Faraday rotator, a switchable Pockels cell optical modulator or a switchable Kerr cell optical modulator may also be adopted as the polarization adjusting module 344.

In addition, the optical path switching module 340 shown in FIG. 4 further includes a reflective prism 346a and a reflective prism 346b. Two sides of the reflective prism 346a are adjacent to one side of the polarization beam splitter 342a and one side of the polarization beam splitter 342b. In this embodiment, the reflective prism 346a is located below the polarization beam splitter 342a and on the left side of the polarization beam splitter 342b. Two sides of the reflective prism 346b are adjacent to another side of the polarization beam splitter 342a and another side of the polarization beam splitter 342b. In this embodiment, the reflective prism 346b is located on the right side of the polarization beam splitter 342a and above the polarization beam splitter 342b.

At a time spot (e.g., when T=k), the optical path switching module 340 switches on the polarization adjusting module. The polarization directions of the polarization beam P1 and the polarization beam P2 are alternated by the switched-on polarization adjusting module 344. The polarization beam P1 is transformed into an S-polarized beam. The polarization beam P2 is transformed into a P-polarized beam. A beam combined by the polarization beam splitter 342b is projected from the first light-emitting surface O1 to the first projection lens 360 for forming an image formation beam V1.

At another time spot (e.g., when T=k+1), the optical path switching module 340 switches off the polarization adjusting module 344. The polarization directions of the polarization beam P1 and the polarization beam P2 are unchanged because the polarization adjusting module 344 is off. In this case, a beam combined by the polarization beam splitter 342b is projected from the second light-emitting surface O2 to the projection lens 362 for forming an image formation beam V2.

As mentioned in above paragraphs, the optical path switching module 340 may distribute the beam from one light-incident surface IN to different light-emitting surfaces (the first light-emitting surface O1 and the second light-emitting surface O2). In this embodiment, the first light-emitting surface O1 and the second light-emitting surface O2 are different light-emitting surfaces perpendicular to each other.

Figure 5:
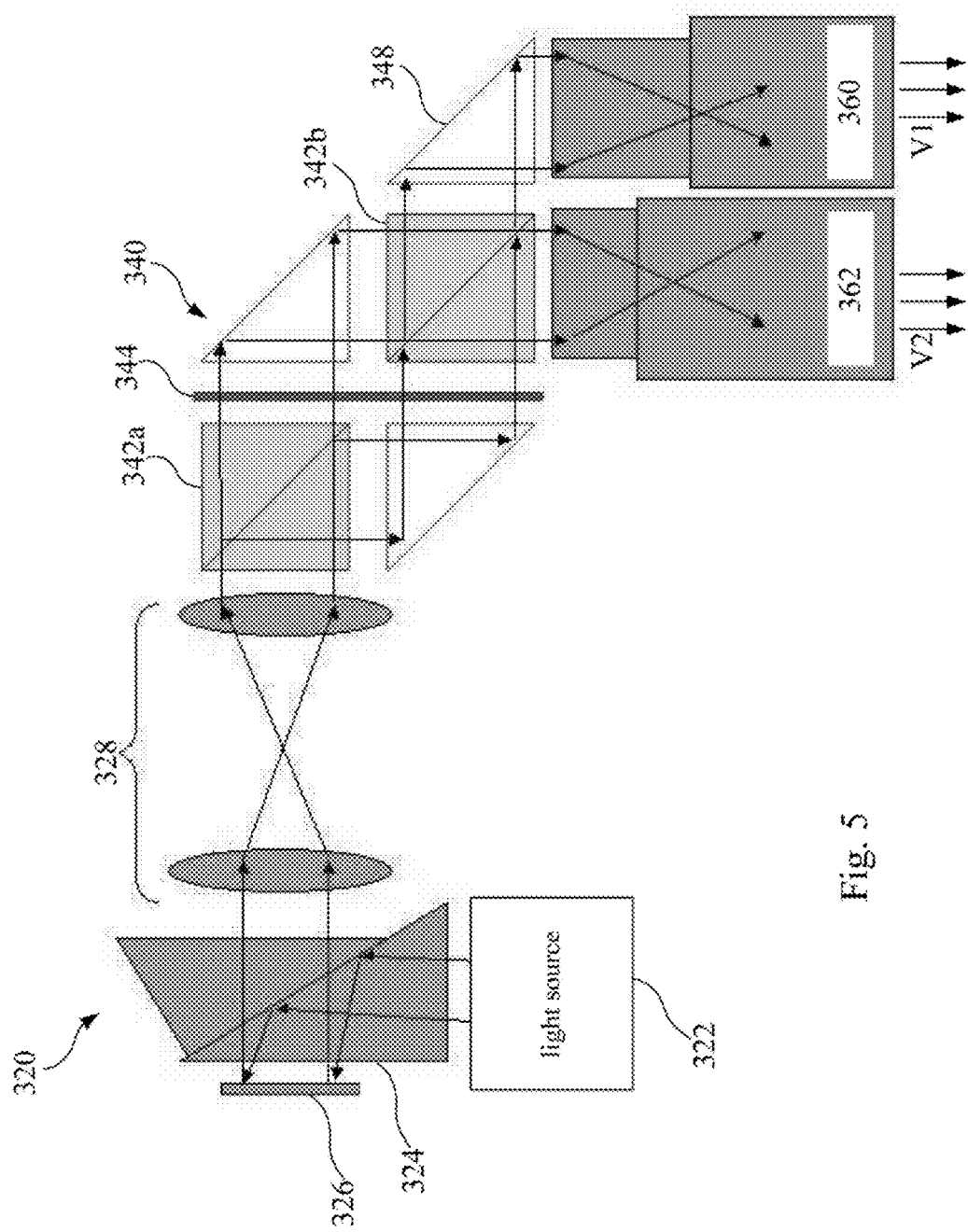
FIG. 5 is a schematic diagram illustrating the optical structures of the stereoscopic display apparatus shown in FIG. 2 according to another embodiment of the invention.

As shown in FIG. 3 and FIG. 4, the beam projected out from the light-emitting surface O1 can be redirected by the light-guiding unit 348 into the projection lens 362 for forming the image formation beam V1, but the invention is limited thereto. Reference is made to FIG. 5, which is a schematic diagram illustrating the optical structures of the stereoscopic display apparatus 300 shown in FIG. 2 according to another embodiment of the invention. In the embodiment shown in FIG. 5, a reflective prism can be adopted as the light-guiding unit 348 for redirecting the beam.

It is noticed that, the stereoscopic display apparatus 300 in the aforesaid embodiments include two sets of projection lenses 360 and 362, and the optical path switching module 340 is used for performing a light distribution with one-to-two and time sequential features. However, the invention is not limited to one-to-two distribution. Based on similar structures, one-to-multiple light distribution with time sequential feature can be achieved.

Figure 6:
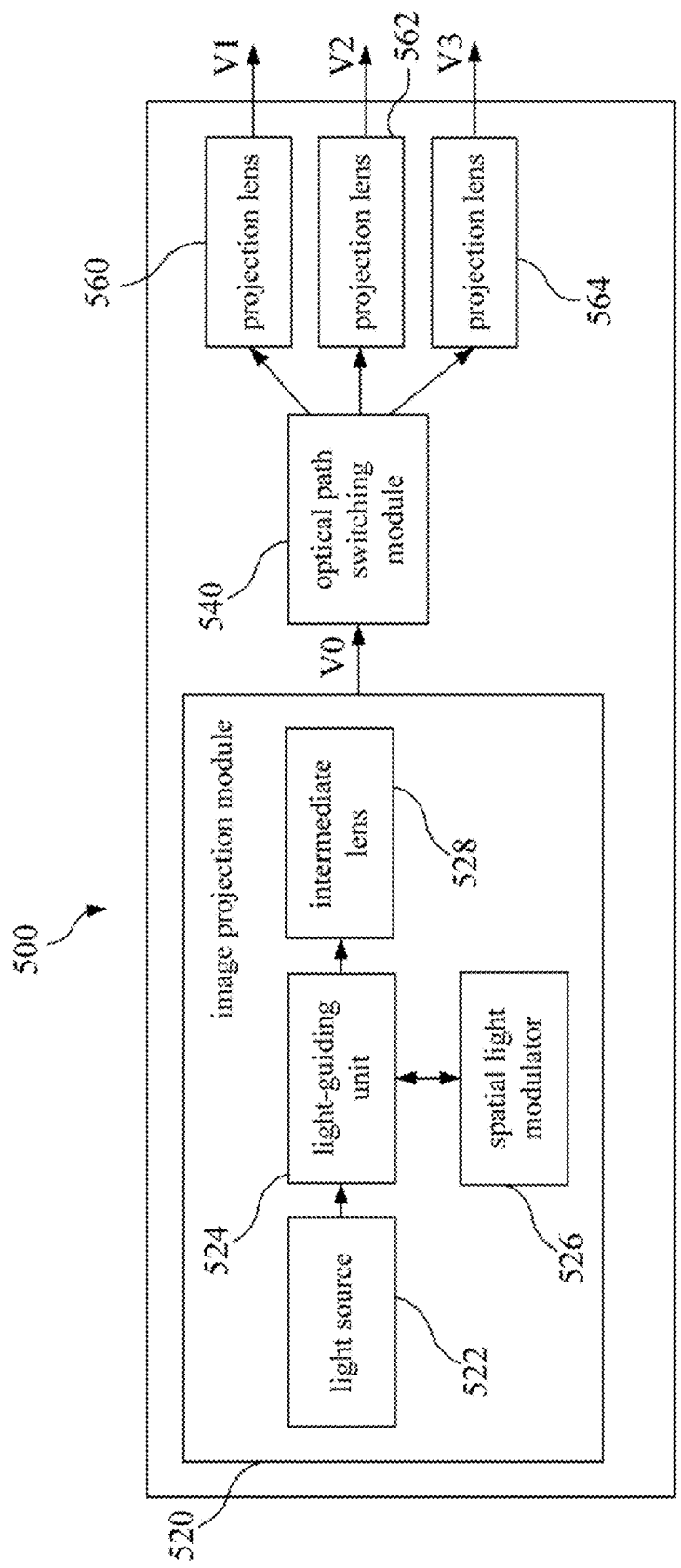
FIG. 6 is a functional block diagram illustrating a stereoscopic display apparatus according to an embodiment of the invention.
Figure 7:
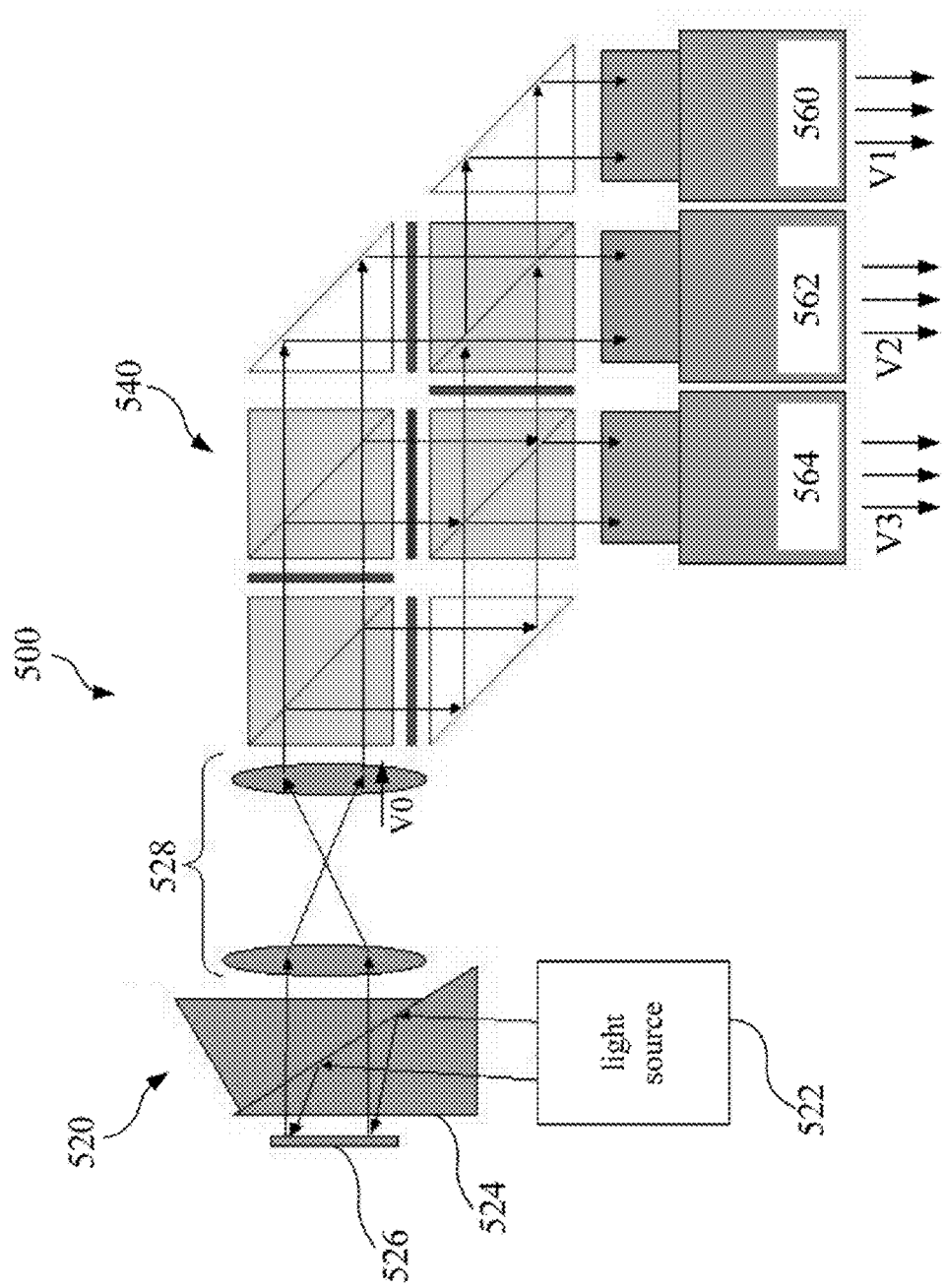
FIG. 7 is a schematic diagram illustrating optical structures of the stereoscopic display apparatus shown in FIG. 6 according to an embodiment of the invention.
Figure 8:
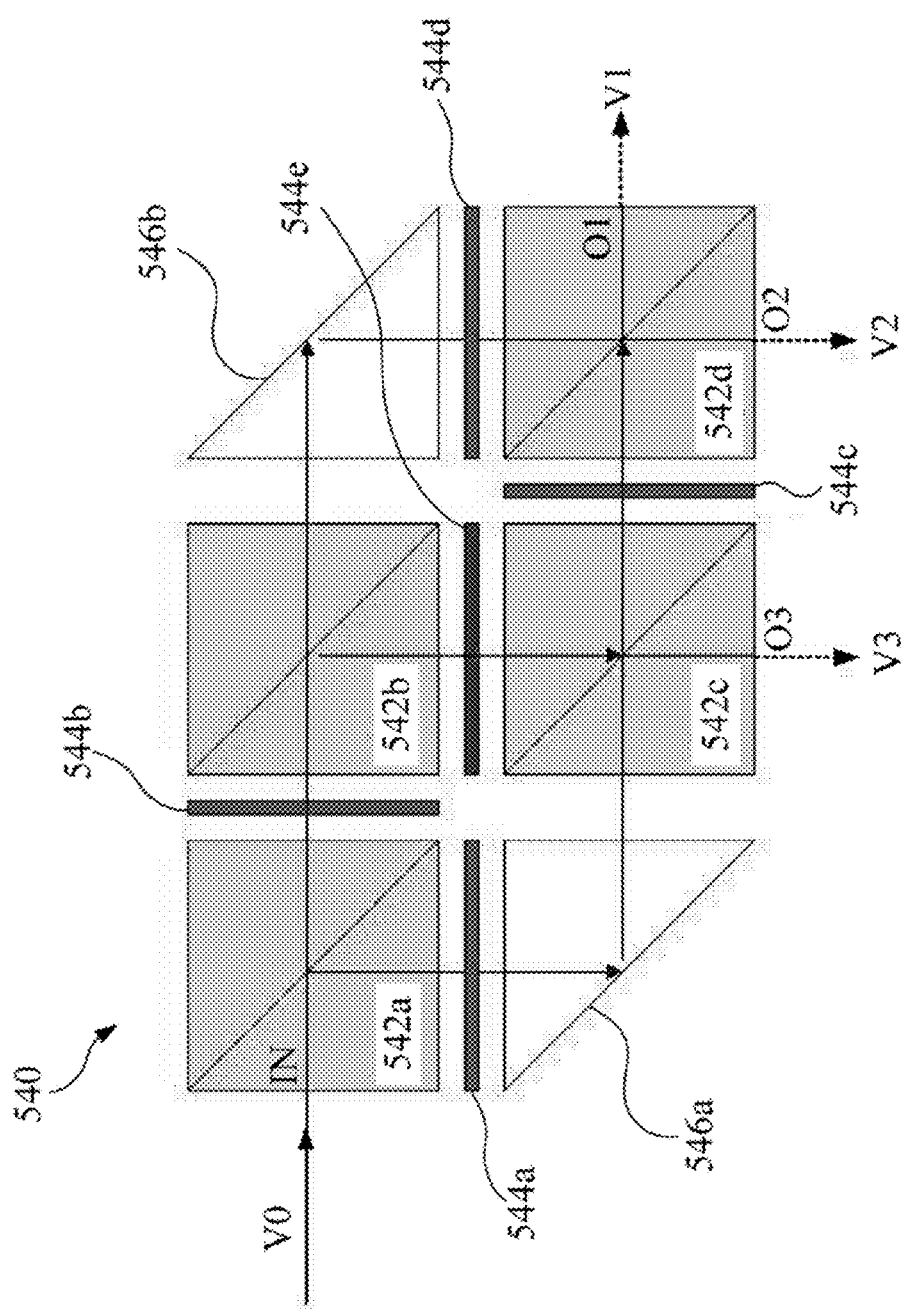
FIG. 8 is a schematic diagram illustrating an optical path switching module shown in FIG. 7.

Reference is made to FIG. 6, FIG. 7 and FIG. 8. FIG. 6 is a functional block diagram illustrating a stereoscopic display apparatus 500 according to an embodiment of the invention. FIG. 7 is a schematic diagram illustrating optical structures of the stereoscopic display apparatus 500 shown in FIG. 6 according to an embodiment of the invention. FIG. 8 is a schematic diagram illustrating an optical path switching module 540 shown in FIG. 7.

As shown in FIG. 6, the stereoscopic display apparatus 500 includes an image projection module 520, an optical path switching module 540 and a plurality of projection lenses. In this embodiment, the stereoscopic display apparatus 500 includes three sets of projection lenses 560, 562 and 564, but the invention is not limited thereto.

The image projection module 520 is used for generating an image signal V0, as shown in FIG. 2. The structures in the stereoscopic display apparatus 500 is similar to the stereoscopic display apparatus 300 disclosed in the aforesaid embodiment. The details can be referred to the paragraphs above, and are not to be repeated herein.

The main difference from the aforesaid embodiment is that, the stereoscopic display apparatus 500 has one image projection module 520 and three sets of projection lenses 560, 562 and 564. The optical path switching module 540 can be used to distribute the beam form one light-incident surface IN to three different light-emitting surfaces O1, O2 and O3. As shown in FIG. 8, the optical path switching module 540 includes four polarization beam splitters 542a, 542b, 542c and 542d and a polarization adjusting module. In this case, the polarization adjusting module includes five polarization adjusting units 544a, 544b, 544c, 544d and 544e.

The polarization beam splitter 542a has a light-incident surface IN. The image signal V0 enters the polarization beam splitter 542a through the light-incident surface IN. The polarization beam splitter 542c has a third light-emitting surface O3. The polarization beam splitter 542d has a first light-emitting surface O1 and a second light-emitting surface O2 different from the first light-emitting surface O1.

The polarization adjusting unit 544a is disposed on an optical path between the polarization beam splitter 542a and the polarization beam splitter 542c. The polarization adjusting unit 544b is disposed on an optical path between the polarization beam splitter 542a and the polarization beam splitter 542b. The polarization adjusting unit 544c is disposed on an optical path between the polarization beam splitter 542c and the polarization beam splitter 542d. The polarization adjusting unit 544d is disposed on an optical path between the polarization beam splitter 542b, and the polarization beam splitter 542d. The polarization adjusting unit 544e is disposed on an optical path between the polarization beam splitter 542b and the polarization beam splitter 542c. In this embodiment, the polarization adjusting units 544a, 544b, 544c and 544d must be switchable, and the polarization adjusting unit 544e can be fixed at on-state.

A switchable liquid crystal layer, a switchable ferroelectric liquid crystal layer, a switchable Faraday rotator, a switchable Pockels cell optical modulator or a switchable Kerr cell optical modulator can also be adopted as each one of the polarization adjusting units 544a, 544b, 544c and 544d.

The polarization adjusting unit 544e does not need to be switchable. A fixed half wave plate can be adopted as the polarization adjusting unit 544e, such as a half wave phase retardar made of a birefringent dielectric material.

In addition, the optical path switching module 540 further includes a reflective prism 546a and another reflective prism 546b. Two sides of the reflective prism 546a are adjacent to one side of the polarization beam splitter 542a and one side of the polarization beam splitter 542c. Two sides of the reflective prism 546b are adjacent to one side of the polarization beam splitter 542b and one side of the polarization beam splitter 542d.

At a first time spot (e.g., when T=k), the polarization adjusting unit 544a is switched on; the polarization adjusting unit 544b is switched off; the polarization adjusting unit 544c is switched off; and the polarization adjusting unit 544d is switched on. The image signal V0 is projected from the first light-emitting surface O1 to the projection lens 560 for forming an image formation beam V1.

At a second time spot (e.g., when T=k+1), the polarization adjusting unit 544a is switched on; the polarization adjusting unit 544b is switched off; the polarization adjusting unit 544c is switched on; and the polarization adjusting unit 544d is switched off. The image signal V0 is projected from the second light-emitting surface O2 to the projection lens 562 for forming an image formation beam V2.

At a third time spot (e.g., when T=k+2), the polarization adjusting unit 544a is switched off; and the polarization adjusting unit 544b is switched on. The image signal V0 is projected from the third light-emitting surface O3 to the projection lens 564 for forming an image formation beam V3.

As mentioned in the above paragraphs, the optical path switching module 540 may switch each of the polarization adjusting units and distribute the image signal V0 generated by one image projection module 520 to three different light-emitting surfaces, such that a one-to-three light distribution with time sequential features is achieved. By extending structures of optical path switching modules disclosed in the aforesaid embodiments, a one-to-N light distribution with time sequential features can be achieved (N can be any positive integer). In this way, one image projection module may correspond to multiple projection lenses.

As mentioned in the above paragraphs, the disclosure provides a stereoscopic display apparatus including an optical path switching module. The optical path switching module has a light-incident surface and several different light-emitting surfaces. By utilizing a switchable polarization adjusting module of the optical path switching module, an image signal generated by one image projection module is guided to different projection lenses via each of the light-emitting surfaces time-sequentially. Therefore, the image projection module combined with the optical path switching module in the invention may equivalently form several optical outlet paths, such that no extra image projection module is needed for corresponding to multiple image displaying areas. Without implementing extra image projection module, the total cost, weight and size of the stereoscopic display apparatus can be reduced.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded with the broadest interpretation so as to encompass all such modifications and similar structures.

What is claimed is:

1. A stereoscopic display apparatus, comprising:
an image projection module;
a plurality of projection lenses; and
an optical path switching module disposed between the image projection module and the projection lenses, the optical path switching module having a light-incident surface and different light-emitting surfaces, wherein an image signal generated by the image projection module enters the optical path switching module through the light-incident surface, the optical path switching module comprising a plurality of polarization beam splitters and a polarization adjusting module, wherein the polarization adjusting module is disposed between the polarization beam splitters, and the optical path switching module is used for switching the polarization adjusting module time-sequentially for guiding the image signal to different light-emitting surfaces respectively, so as to form a plurality of image formation beams from the light-emitting surfaces through the projection lenses, and one of the image formation beams is corresponding to a left-vision image, and another one of the image formation beams is corresponding to a right-vision image.

2. The stereoscopic display apparatus as claimed in claim 1, wherein the projection lenses comprise a first projection lens and a second projection lens, and the optical path switching module comprises:
a first polarization beam splitter having a light-incident surface, wherein the image signal enters the optical path switching module through the light-incident surface of the first polarization beam splitter, and the first polarization beam splitter is used for spitting the image signal into a first polarization beam and a second polarization beam with different polarization directions; and
a second polarization beam splitter having a first light-emitting surface and a second light-emitting surface different from the first light-emitting surface, wherein the second polarization beam splitter is used for combining the first polarization beam and the second polarization beam;
wherein, the polarization adjusting module is disposed on an optical path between the first polarization beam splitter and the second polarization beam splitter, and the optical path switching module is used for switching the polarization adjusting module time-sequentially;
at a first time spot, the polarization adjusting module is switched on, and polarization directions of the first polarization beam and the second polarization beam are alternated, and a beam combined by the second polarization beam splitter is projected from the first light-emitting surface through the first projection lens for forming a first image formation beam; and
at a second time spot, the polarization adjusting module is switched off, the polarization directions of the first polarization beam and the second polarization beam are unchanged, and a beam combined by the second polarization beam splitter is projected from the second light-emitting surface to the second projection lens for forming a second image formation beam.

3. The stereoscopic display apparatus as claimed in claim 2, wherein each of the first polarization beam and the second polarization beam has a different polarization direction which is a S-polarized or P-polarized beam.

4. The stereoscopic display apparatus as claimed in claim 3, wherein the S-polarized beam is reflected and redirected while passing through the first polarization beam splitter and the second polarization beam splitter, and the P-polarized beam passes straight through the first polarization beam splitter and the second polarization beam splitter.

5. The stereoscopic display apparatus as claimed in claim 2, wherein the optical path switching module further comprises:
a first reflective prism, two sides of the first reflective prism are adjacent to one side of the first polarization beam splitter and one side of the second polarization beam splitter; and
a second reflective prism, two sides of the second reflective prism are adjacent to another side of the first polarization beam splitter and another side of the second polarization beam splitter.

6. The stereoscopic display apparatus as claimed in claim 2, wherein the polarization adjusting module comprises a switchable liquid crystal layer, a switchable ferroelectric liquid crystal layer, a switchable Faraday rotator, a switchable Pockels cell optical modulator or a switchable Kerr cell optical modulator.

7. The stereoscopic display apparatus as claimed in claim 1, wherein the projection lenses comprise a first projection lens, a second projection lens and a third projection lens, and the optical path switching module comprises:
a first polarization beam splitter having a light-incident surface, wherein the image signal enters the optical path switching module through the light-incident surface of the first polarization beam splitter;
a second polarization beam splitter;
a third polarization beam splitter having a third light-emitting surface; and
a fourth polarization beam splitter having a first light-emitting surface and a second light-emitting surface different from the first light-emitting surface;
wherein, the polarization adjusting module comprising:
a first polarization adjusting unit disposed on an optical path between the first polarization beam splitter and the third polarization beam splitter;
a second polarization adjusting unit disposed on an optical path between the first polarization beam splitter and the second polarization beam splitter;
a third polarization adjusting unit disposed on an optical path between the third polarization beam splitter and the fourth polarization beam splitter;
a fourth polarization adjusting unit disposed on an optical path between the second polarization beam splitter and the fourth polarization beam splitter; and
a fifth polarization adjusting unit disposed on an optical path between the second polarization beam splitter and the third polarization beam splitter;
wherein, at a first time spot, the first polarization adjusting unit is switched on, and the second polarization adjusting unit is switched off, and the third polarization adjusting unit is switched off, and the fourth polarization adjusting unit is switched on, and the image signal is projected from the first light-emitting surface through the first projection lens for forming a first image formation beam;

at a second time spot, the first polarization adjusting unit is switched on, and the second polarization adjusting unit is switched off, and the third polarization adjusting unit is switched on, and the fourth polarization adjusting unit is switched off, and the image signal is projected from the second light-emitting surface through the second projection lens for forming a second image formation beam; and at a third time spot, the first polarization adjusting unit is switched off, and the second polarization adjusting unit is switched on, and the image signal is projected from the third light-emitting surface through the third projection lens for forming a third image formation beam.

8. The stereoscopic display apparatus as claimed in claim 7, wherein each of the first polarization adjusting unit, the second polarization adjusting unit, the third polarization adjusting unit and the fourth polarization adjusting unit of the polarization adjusting module comprises a switchable liquid crystal layer, a switchable ferroelectric liquid crystal layer, a switchable Faraday rotator, a switchable Pockels cell optical modulator or a switchable Kerr cell optical modulator.

9. The stereoscopic display apparatus as claimed in claim 7, wherein the fifth polarization adjusting unit of the polarization adjusting module comprises a half wave phase retarder.

10. The stereoscopic display apparatus as claimed in claim 7, wherein the optical path switching module further comprises:

a first reflective prism of which two sides are adjacent to one side of the first polarization beam splitter and one side of the third polarization beam splitter; and a second reflective prism of which two sides are adjacent to one side of the second polarization beam splitter and one side of the fourth polarization beam splitter.

* * * * *